(12) United States Patent
Mitsumoto et al.

(10) Patent No.: US 11,312,381 B2
(45) Date of Patent: Apr. 26, 2022

(54) FOUR-WHEEL DRIVE FORCE DISTRIBUTION APPARATUS

(71) Applicant: TOYOTA JIDOSHA KABUSHIKI KAISHA, Toyota (JP)

(72) Inventors: Hisanori Mitsumoto, Hadano (JP); Tomohiko Niwa, Anjo (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 17/209,978

(22) Filed: Mar. 23, 2021

(65) Prior Publication Data

US 2021/0354697 A1 Nov. 18, 2021

(30) Foreign Application Priority Data

May 18, 2020 (JP) .............................. JP2020-086791

(51) Int. Cl.
*B60W 30/18* (2012.01)
*B60W 10/184* (2012.01)
(Continued)

(52) U.S. Cl.
CPC ....... *B60W 30/18145* (2013.01); *B60K 17/35* (2013.01); *B60W 10/10* (2013.01); *B60W 10/184* (2013.01); *B60W 40/107* (2013.01); *B60W 40/109* (2013.01); *B60W 2510/0657* (2013.01); *B60W 2510/1005* (2013.01); *B60W 2520/10* (2013.01); *B60W 2520/105* (2013.01); *B60W 2520/125* (2013.01);
(Continued)

(58) Field of Classification Search
CPC .... B60W 10/10; B60W 10/119; B60W 10/14; B60W 10/16; B60W 10/184; B60W 30/18145; B60W 40/107; B60W 40/109; B60W 2510/0657; B60W 2510/1005; B60W 2520/10; B60W 2520/105; B60W 2520/125; B60W 2530/10; B60W 2540/18; B60W 2710/105; B60W 2710/18; B60W 2720/403; B60W 2720/406; B60K 17/35
See application file for complete search history.

(56) References Cited

U.S. PATENT DOCUMENTS

| 5,225,984 A * | 7/1993 | Nakayama | ......... B60K 23/0808 |
| | | | 180/197 |
| 2009/0063002 A1 * | 3/2009 | Ono | .................... B60W 40/103 |
| | | | 701/83 |

(Continued)

FOREIGN PATENT DOCUMENTS

| JP | 2001-063397 A | 3/2001 |
| JP | 2012-011833 A | 1/2012 |

*Primary Examiner* — Edwin A Young
(74) *Attorney, Agent, or Firm* — Sughrue Mion, PLLC

(57) ABSTRACT

A four-wheel drive force distribution apparatus for distributing drive forces to the wheels of a four-wheel drive vehicle, in which the distribution of drive force to the front inside wheel (2a) and the distribution of drive force to the rear inside wheel (3a) are adjusted based on a ground load of the front inside wheel (2a) and a ground load of the rear inside wheel (3a) when the vehicle is turning, and the distribution of drive force to the front inside wheel (2a) compared with distribution of drive force to the rear inside wheel (3a) is reduced the smaller the ratio of the ground load of the front inside wheel (2a) to the ground load of the rear inside wheel (3a) during turning.

9 Claims, 14 Drawing Sheets

(51) Int. Cl.
*B60K 17/35* (2006.01)
*B60W 40/107* (2012.01)
*B60W 40/109* (2012.01)
*B60W 10/10* (2012.01)

(52) U.S. Cl.
CPC ..... *B60W 2530/10* (2013.01); *B60W 2540/18* (2013.01); *B60W 2710/105* (2013.01); *B60W 2710/18* (2013.01)

(56) References Cited

U.S. PATENT DOCUMENTS

| | | | |
|---|---|---|---|
| 2014/0145498 A1* | 5/2014 | Yamakado | B60W 30/02 303/3 |
| 2019/0023263 A1* | 1/2019 | Shoji | B60W 10/18 |

\* cited by examiner

AMOUNT OF CHANGE OF WHEEL GROUND LOAD $\Delta wx = \frac{1}{2} \cdot \frac{mGxHs}{L}$ AMOUNT OF CHANGE OF FRONT WHEEL GROUND LOAD $\Delta wy = \frac{mGyHs}{T} \cdot Dwf$ AMOUNT OF CHANGE OF REAR WHEEL GROUND LOAD $\Delta wz = \frac{mGyHs}{T} \cdot (1-Dwf)$ $$Gy = \frac{1}{1+KV^2} \cdot \frac{V}{nL} \cdot St$$

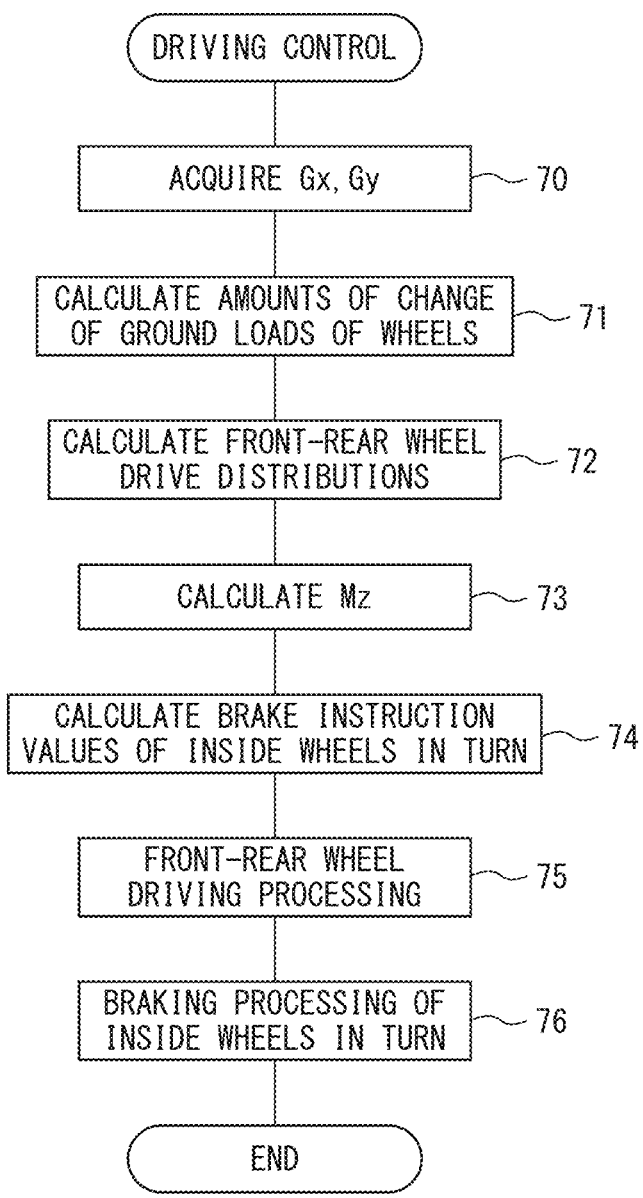

FOUR-WHEEL DRIVE FORCE DISTRIBUTION APPARATUS

FIELD

The present invention relates to a four-wheel drive force distribution apparatus.

BACKGROUND

The tires used in a vehicle, that is, the wheels, become greater in grip strengths by the ground surface the greater the ground loads of the wheels and become smaller in grip strengths by the ground surface the smaller the ground loads of the wheels. If imparting large drive forces to the wheels when the grip strengths by the ground surface become small, the wheels will slip and the vehicle will become unable to be suitably steered. On the other hand, if the vehicle is turned, the ground loads of the inside wheels positioned at the inside when viewed from the center of turn become smaller than the ground loads of the outside wheels positioned at the outside when viewed from the center of turn. At this time, if imparting large drive forces to the inside wheels where the ground loads become smaller, the inside wheels will slip and the vehicle can no longer be suitably steered.

Therefore, in a two-wheel drive vehicle, there is known a two-wheel drive force distribution apparatus configured to make the drive force of the inside wheel (drive wheel) smaller than the drive force of the outside wheel (drive wheel) when the vehicle has turned (for example, see Japanese Unexamined Patent Publication No. 2001-063397).

SUMMARY

In this regard, in a four-wheel drive vehicle as well, at the time of vehicle turning, the ground loads of the inside wheels become smaller than the ground loads of the outside wheels. At the same time, the ground load of the front inside wheel becomes smaller than the ground load of the rear inside wheel. However, if applying the above-mentioned two-wheel drive force distribution apparatus to the pair of front wheels and simultaneously applying it to the pair of rear wheels, when the vehicle turns, despite the ground load of the front inside wheel becoming smaller than the ground load of the rear inside wheel, the same drive forces are given to the front inside wheel and the rear inside wheel. As a result, the front inside wheel with the small ground load slips resulting in an understeer state.

According to the present invention, there is provided a four-wheel drive force distribution apparatus for distributing drive forces to wheels of a four-wheel drive vehicle, wherein the apparatus is configured to adjust a distribution of drive force to a front inside wheel and a distribution of drive force to a rear inside wheel based on a ground load of the front inside wheel and a ground load of the rear inside wheel when the vehicle is turning and reduce the distribution of drive force to the front inside wheel compared with the distribution of drive force to the rear inside wheel the smaller a ratio of the ground load of the front inside wheel to the ground load of the rear inside wheel during turning.

According to the present invention, it is possible to secure a suitable steering action of a vehicle while improving a driving performance of the vehicle.

BRIEF DESCRIPTION OF DRAWINGS

FIG. 17 is a flow chart for performing driving control.

DESCRIPTION OF EMBODIMENTS

Figure 1:
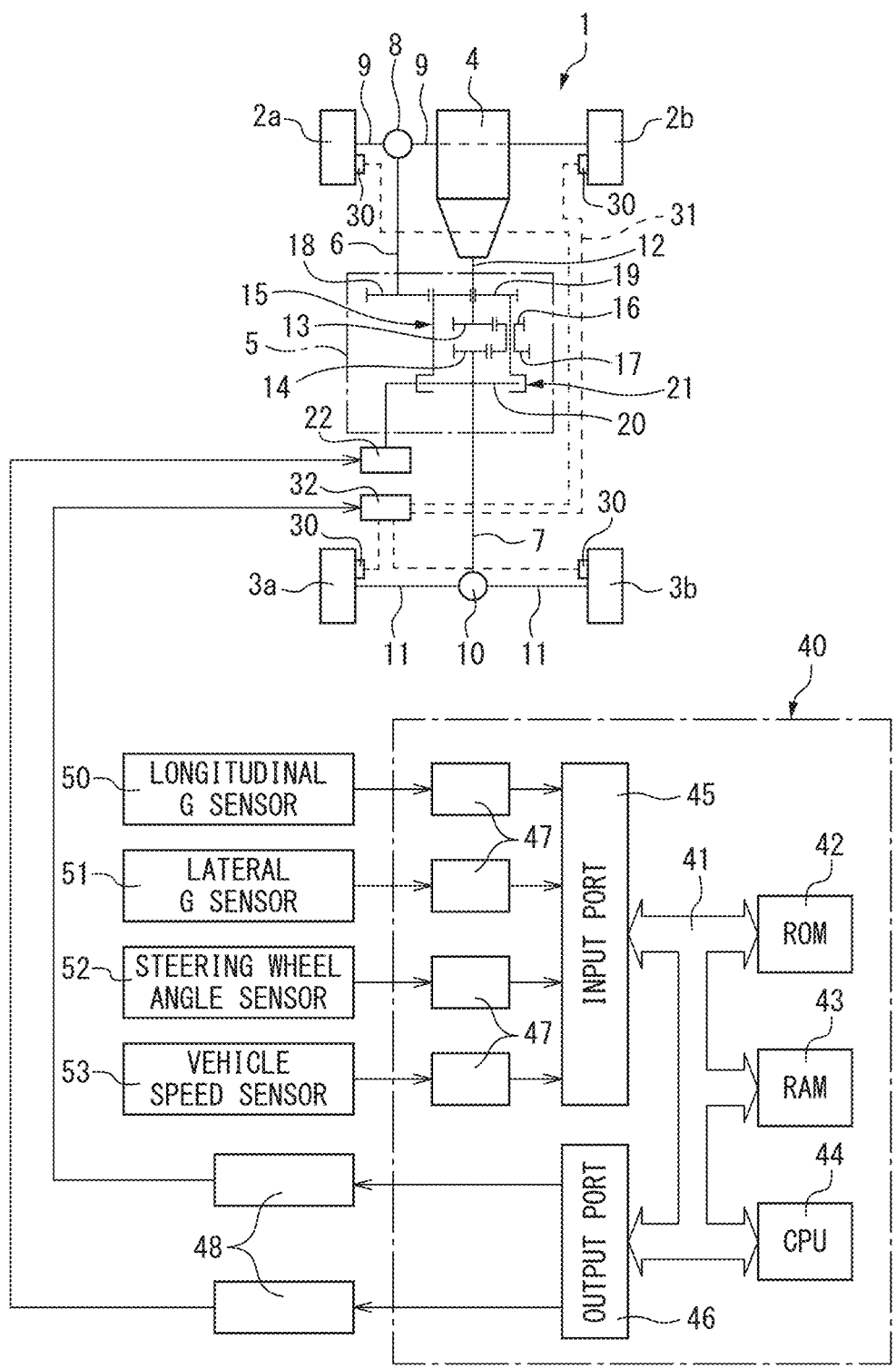
FIG. 1 is an overview schematically showing a four-wheel drive force distribution apparatus of a vehicle.

First, referring to FIG. 1, a four-wheel drive force distribution apparatus of a vehicle will be explained. Note that, this four-wheel drive force distribution apparatus is one example. Instead of the four-wheel drive force distribution apparatus shown in FIG. 1, the various known apparatuses for distribution of drive forces to four wheels which can distribute drive forces to the front and rear wheels in any way can be used. If referring to FIG. 1, the vehicle as a whole is shown by reference numeral 1. Note that, in FIGS. 1, 2a and 2b show a pair of front wheels, 3a and 3b show a pair of rear wheels, 4 shows an internal combustion engine, and 5 shows a drive torque distributor. From the drive torque distributor 5, a front drive shaft 6 extends to the front and a rear drive shaft 7 extends to the rear. The front drive shaft 6 is connected through a front differential gear 8 and corresponding shafts 9 to the front wheels 2a and 2b, while the rear drive shaft 7 is connected through a rear differential gear 10 and corresponding shafts 11 to the rear wheels 3a and 3b.

The drive torque distributor 5 is comprised of a planetary gear mechanism provided with a first sun gear 13 fixed to an output shaft 12 of the internal combustion engine 1, a second sun gear 14 fixed to the rear drive shaft 7, and a planetary carrier 15 supported to be able to rotate about the output shaft 12 of the internal combustion engine 1 and the rear drive shaft 7. This planetary carrier 15 rotatably supports a first planetary gear 16 and second planetary gear 17 which respectively engage the first sun gear 13 and second sun gear 14 and integrally rotate with the planetary carrier 15. Furthermore, at one end of the planetary carrier 15, a gear 19 is formed able to engage with a gear 18 fixed to the front drive shaft 6 and able to rotate about the output shaft 12 of the internal combustion engine 1, while at the other end of the planetary carrier 15, a hydraulic clutch mechanism 21 is formed able to adjust a coupled state of a clutch plate 20 fixed on the rear drive shaft 7 and the planetary carrier 15. This hydraulic clutch mechanism 21 is controlled by a hydraulic control device 22.

On the other hand, as shown in FIG. 1, hydraulic brake devices 30 are respectively attached to the front wheels 2a and 2b and the rear wheels 3a and 3b. The hydraulic brake devices 30 are coupled with a brake control device 32 through corresponding brake fluid tubes 31 shown by broken lines. This brake control device 32 is provided with a master cylinder generating brake fluid pressure by an operation to depress a brake pedal and a brake fluid pressure adjusting device able to adjust the generated brake fluid pressure to generate brake fluid pressure different for each of the brake devices 30 of the front wheels 2a and 2b and rear wheels 3a and 3b. That is, using the brake control device 32, the braking forces of the front wheels 2a and 2b and rear wheels 3a and 3b can be respectively independently controlled.

Further, FIG. 1 shows an electronic control unit 40 mounted in the vehicle 1. This electronic control unit 40 is comprised of a digital computer which is provided with a ROM (read only memory) 42, RAM (random access memory) 43, CPU (microprocessor) 44, input port 45, and output port 46, which are connected with each other by a bidirectional bus 41. As shown in FIG. 1, in the vehicle 1, a longitudinal acceleration sensor 50 detecting acceleration in a longitudinal direction of the vehicle 1 (below, referred to as a longitudinal G sensor), a lateral acceleration sensor 51 detecting acceleration in a lateral direction of the vehicle 1 (below, referred to as lateral G sensor), a steering wheel angle sensor 52 detecting a steering wheel angle, and a vehicle speed sensor 53 detecting a vehicle speed. The output signals of these longitudinal G sensor 50, lateral G sensor 51, steering wheel angle sensor 52, and vehicle speed sensor 53 are input through corresponding AD converters 47 to the input port 45. On the other hand, the output port 46 is connected through corresponding drive circuits 48 to the hydraulic control device 22 and brake control device 32.

Figure 2:
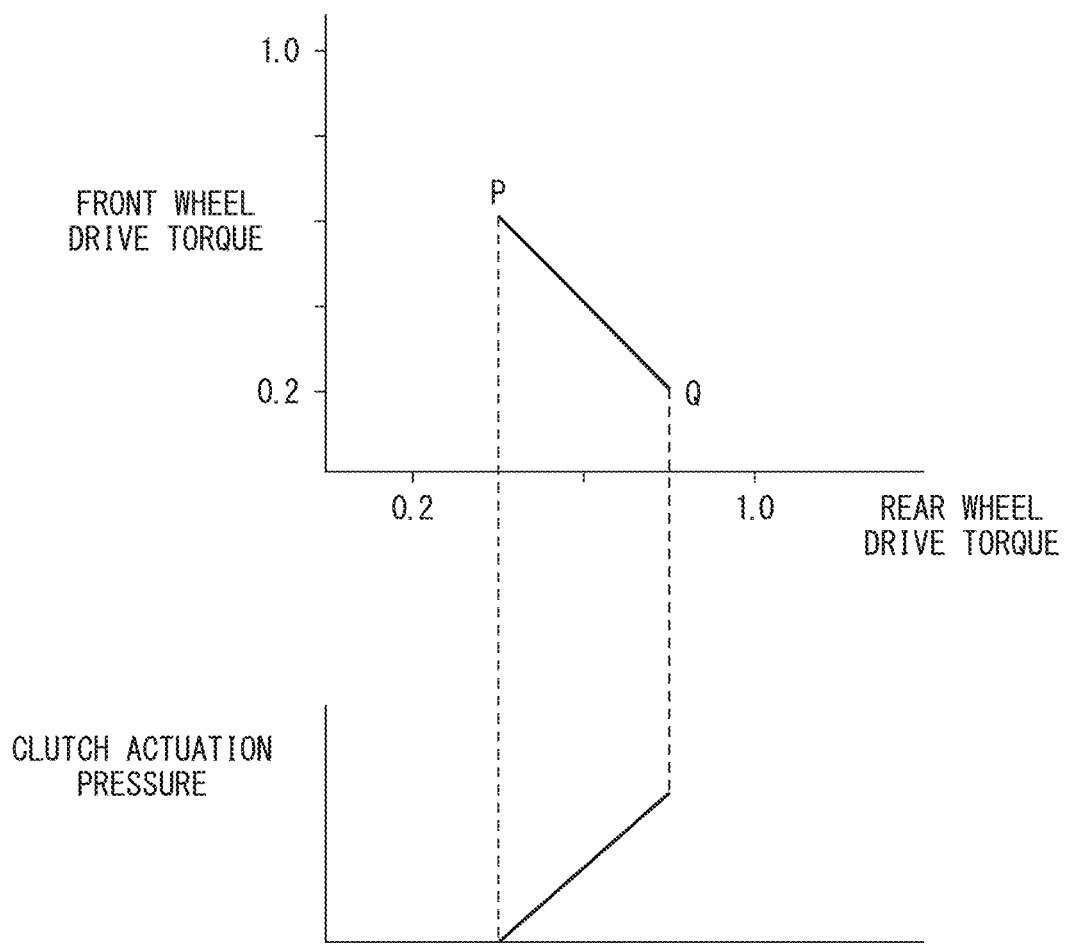
FIG. 2 is a view showing a relationship between a front wheel drive torque and a rear wheel drive torque.

In FIG. 1, the output torque of the internal combustion engine 1 is distributed in the drive torque distributor 5 to a drive torque of the front drive shaft 6 for driving the front wheels 2a and 2b and a drive torque of the rear drive shaft 7 for driving the rear wheels 3a and 3b. The control for distribution of the drive torques is performed by control of the clutch actuation fluid pressure of the hydraulic clutch mechanism 21 by the hydraulic control device 22. FIG. 2 shows the relationship between the distribution of front wheel drive torque distributed to the front drive shaft 6, the distribution of rear wheel drive torque distributed to the rear drive shaft 7, and the clutch actuation pressure of the hydraulic clutch mechanism 21. In the drive torque distributor 5 shown in FIG. 1, if the clutch actuation pressure of the hydraulic clutch mechanism 21 falls and the clutch becomes a disengaged state, the output torque of the internal combustion engine 1 is on the one hand transmitted through the first sun gear 13, first planetary gear 16, and planetary carrier 15 to the front drive shaft 6 and is on the other hand transmitted through the first sun gear 13, first planetary gear 16, second planetary gear 17, and second sun gear 14 to the rear drive shaft 7. At this time, the distributions of drive torques to the front drive shaft 6 and the rear drive shaft 7 become constant values corresponding to the numbers of teeth of the first sun gear 13, second sun gear 14, first planetary gear 16, and second planetary gear 17. In the drive torque distributor 5 shown in FIG. 1, at this time, as shown by the point P in the figure, the distribution of front wheel torque distributed to the front drive shaft 6 becomes 0.6 while the distribution of rear wheel drive torque distributed to the rear drive shaft 7 becomes 0.4.

On the other hand, if the clutch actuation pressure of the hydraulic clutch mechanism 21 is made to rise and the clutch becomes an engaged state, the output torque of the internal combustion engine 1 is on the one hand transmitted through the first sun gear 13, first planetary gear 16, and planetary carrier 15 to the front drive shaft 6 and is on the other hand transmitted through first sun gear 13, first planetary gear 16, and planetary carrier 15 to the rear drive shaft 7. In the drive torque distributor 5 shown in FIG. 1, at this time, as shown by the point Q in the figure, the distribution of front wheel torque distributed to the front drive shaft 6 becomes 0.2 while the distribution of rear wheel drive torque distributed to the rear drive shaft 7 becomes 0.8. Therefore, the distribution of front wheel drive torque and the distribution of rear wheel drive torque can be freely adjusted within the range of P and Q of FIG. 2 by controlling the clutch actuation pressure of the hydraulic clutch mechanism 21.

Figure 3:
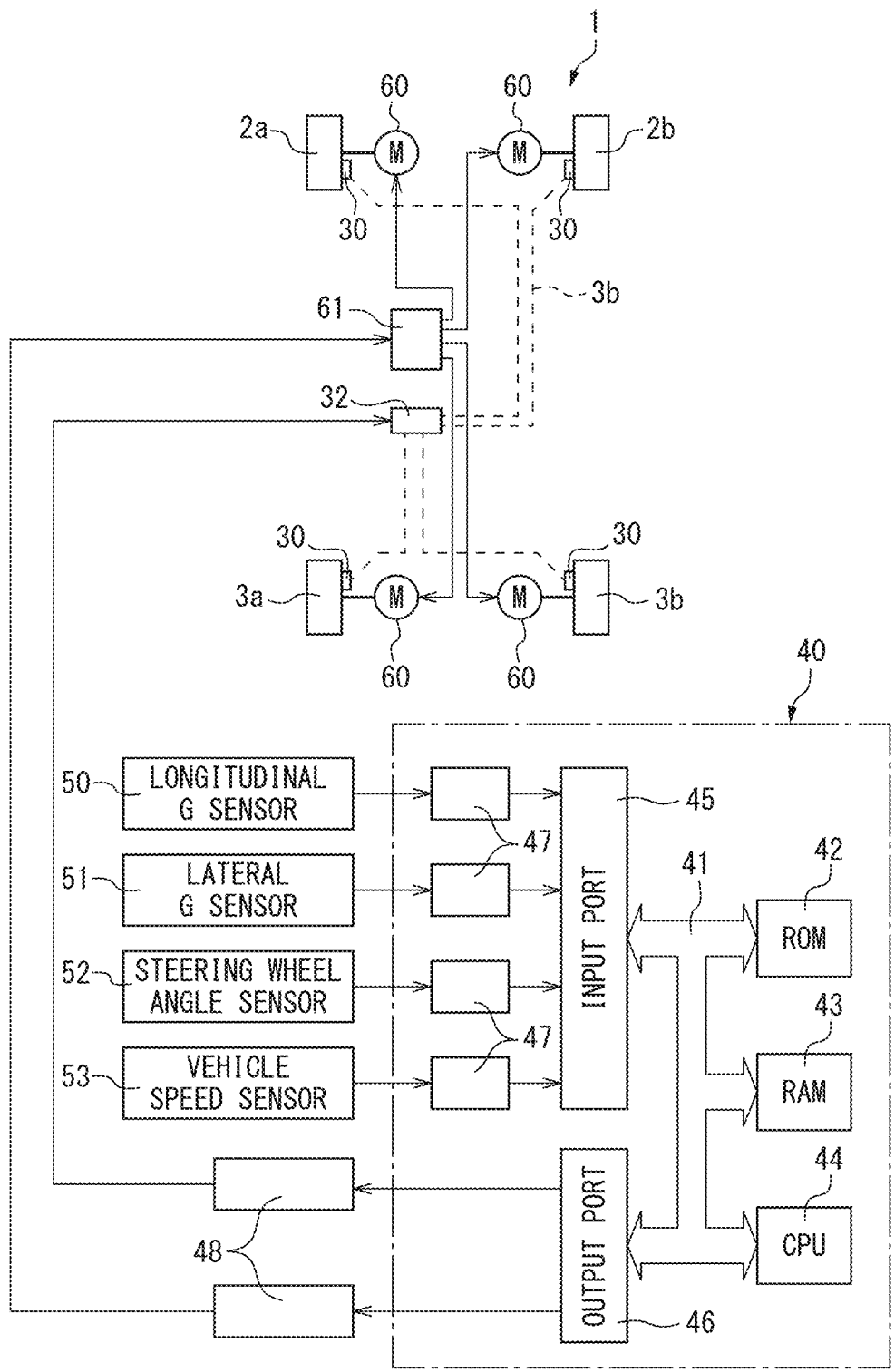
FIG. 3 is an overview schematically showing another example of a four-wheel drive force distribution apparatus of a vehicle.

FIG. 3 shows another example of a four-wheel drive force distribution apparatus of a vehicle. In this example, the front wheels 2a and 2b and the rear wheels 3a and 3b are driven by respectively separate electric motors 60. In the vehicle 1, a motor drive control device 61 is mounted for control of the electric motors 60. Using this motor drive control device 61, the output torques of the electric motors 60 are controlled to respectively independent output torques.

Figure 4:
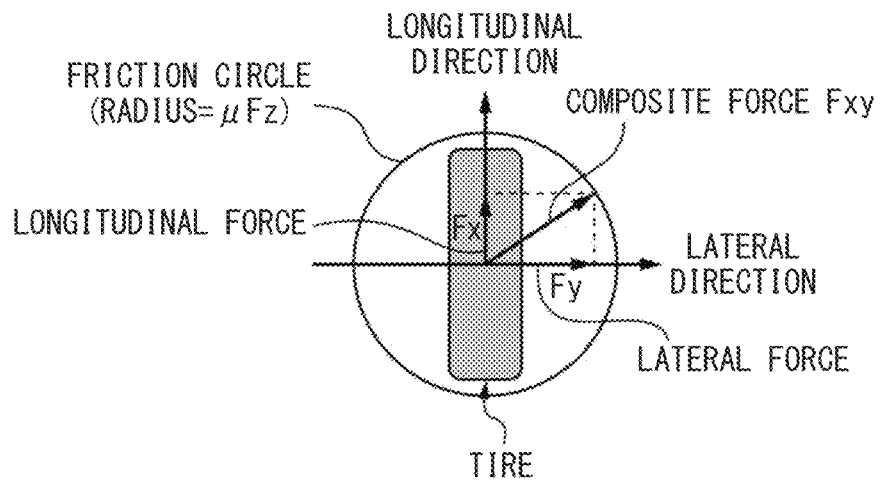
FIG. 4 is a view showing a friction circle.

Next, referring to FIG. 4, the forces acting on the ground contact surface of a tire and a friction circle of the tire will be simply explained. Note that, in FIG. 4, the suffix "x" indicates a longitudinal direction of the vehicle, while the suffix "y" indicates a lateral direction of the vehicle. Now then, if a drive torque is applied to the tire to accelerate the vehicle, that is, if a longitudinal acceleration $G_X$ is applied to the vehicle, a force in the vehicle longitudinal direction, that is, a longitudinal force Fx, acts on the ground contact surface of the tire. This longitudinal force Fx is proportional to the drive torque applied to the tire. On the other hand, if the vehicle is made to turn, a centrifugal force, that is, a lateral acceleration $G_Y$, is generated at the vehicle and force in the lateral direction acts on the vehicle. If force in the lateral direction is applied to the vehicle, a lateral force Fy in the opposite direction to this force in the lateral direction is generated at the ground contact surface of each tire. In this case, explained simply, at the ground contact surface of each tire, a lateral force Fy substantially proportional to the ground load of the tire is generated. Therefore, at the ground contact surface of each tire, a composite force Fxy of the longitudinal force Fx and the lateral force Fy is generated.

On the other hand, if the ground load of the tire is defined as Fz and the coefficient of friction of the tire and road surface is defined as "μ", the circle having Fz·μ as a radius is referred to as a "friction circle". This friction circle is shown in FIG. 4. The radius Fz·μ of this friction circle shows the limit value of the force acting on the ground contact surface of the tire when the ground contact surface of the tire starts to slide against the frictional force. If the composite force Fxy of the longitudinal force Fx and the lateral force Fy exceeds the friction circle, that is, exceeds the limit, the tire starts to slide against the frictional force between the tire and road surface. Therefore, the size of this friction circle expresses the intensity of the grip strength with respect the tire. Note that, the size of this friction circle is proportional to the ground load of the tire. Therefore, the greater the ground load of the tire, the stronger grip strength with respect the tire. In the vehicle, it is not possible to generate a composite force Fxy exceeding the friction circle, that is, exceeding the limit, at the ground contact surface of the tire. Usually, a vehicle is driven so that the composite force Fxy generated at the ground contact surface of the tire does not exceed the friction circle.

Figure 5A:
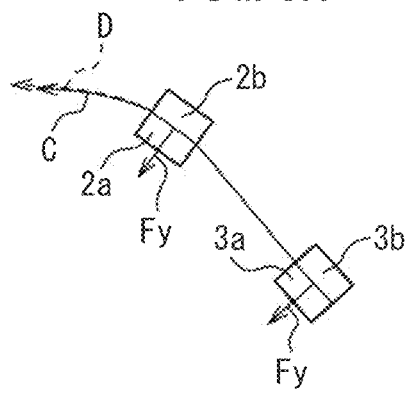
FIG. 5A, FIG. 5B, and FIG. 5C are views for explaining behavior of a vehicle.
Figure 5B:
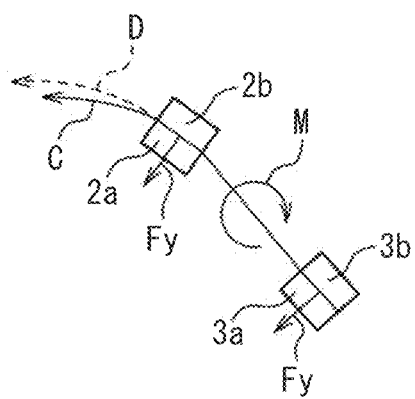
Figure 5C:
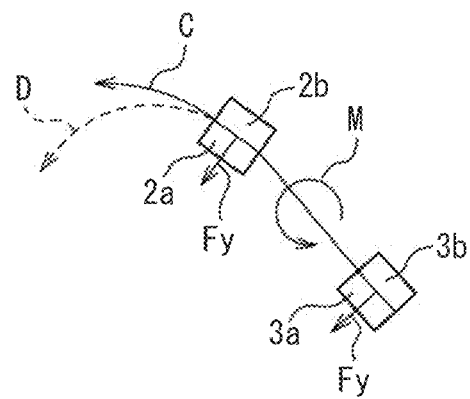

Next, referring to FIG. 5A to FIG. 5C, the behavior of the vehicle occurring if the lateral forces Fy generated at the ground contact surfaces of the tires exceed the friction circles, that is, if the lateral forces Fy generated at the ground contact surfaces of the tires exceed the limit, will be schematically explained using a two-wheel model setting the front wheels 2a and 2b close to each other and the rear wheels 3a and 3b close to each other. Note that, in FIG. 5A to FIG. 5C, the solid line arrow marks C show the target running line while the broken line arrow marks D shows the actual running line. Note that, the arrow marks Fy show the lateral forces generated at the ground contact surfaces of the front wheels 2a and 2b and rear wheels 3a and 3b at the time of vehicle turning. FIG. 5A shows the case where even if lateral forces Fy are generated, the lateral forces Fy do not exceed the friction circles, that is, the lateral forces Fy do not exceed the limits. In this case, the actual running line D is superposed on the target running line C.

On the other hand, FIG. 5B shows the case where the lateral forces Fy generated at the ground contact surfaces of the front wheels 2a and 2b and rear wheels 3a and 3b become larger and the lateral forces Fy generated at the ground contact surfaces of the front wheels 2a and 2b first exceed the friction circles, that is, exceed the limits. In this case, a yaw moment M is generated at the vehicle and the actual running line D bulges to the outside from the target running line C. Such a state is called "understeer" (or "ploughing"). On the other hand, FIG. 5C shows the case where the lateral forces Fy generated at the ground contact surfaces of the front wheels 2a and 2b and rear wheels 3a and 3b become larger and the lateral forces Fy generated at the ground contact surfaces of the rear wheels 3a and 3b first exceed the friction circles, that is, exceed the limits. In this case, a yaw moment M in the direction opposite to FIG. 5B is generated at the vehicle and the vehicle spins whereupon the actual running line D turns to the inside from the target running line C. Such a state is called "oversteer". Note that, if the vehicle spins, it is extremely dangerous. Therefore, usually, a vehicle is designed so that when large lateral forces Fy are generated, first understeer (or ploughing) occurs. An embodiment according to the present invention as well is designed so that when large lateral forces Fy are generated, first understeer (or ploughing) occurs.

Now then, as explained above, if drive torques are applied to the tires, longitudinal forces Fx are generated at the ground contact surfaces of the tires and longitudinal acceleration Gx is generated at the vehicle. In this case, the greater the longitudinal forces Fx that can be generated at the ground contact surfaces of the tires, the higher the longitudinal acceleration Gx can be made, that is, the more the accelerating performance of the vehicle can be improved. On the other hand, if the vehicle is made to turn, a lateral acceleration Gy is generated at the vehicle and lateral forces Fy are generated at the ground contact surfaces of the tires. In this case, the larger the lateral forces Fy generated at the ground contact surfaces of the tires can be made, the higher the lateral acceleration Gy can be made, that is, the better the turning performance of the vehicle can be made. Therefore, the larger the longitudinal forces Fx and lateral forces Fy generated at the ground contact surfaces of the tires can be made in the range where the composite forces Fxy of the longitudinal forces Fx and lateral forces Fy do not exceed the friction circles, the better the accelerating performance and turning performance of the vehicle can be made.

Figure 6A:
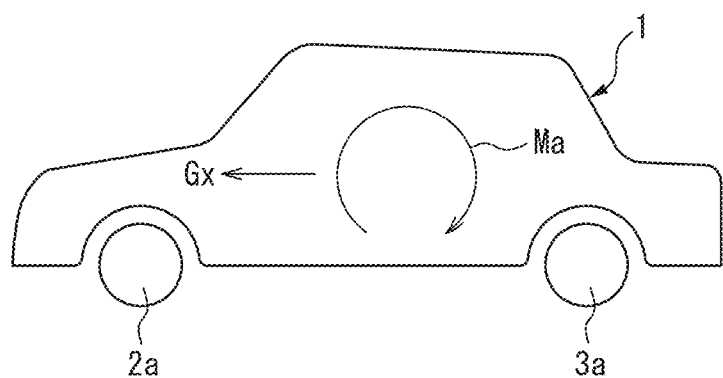
FIG. 6A and FIG. 6B are views for explaining changes in ground loads of wheels.
Figure 6B:
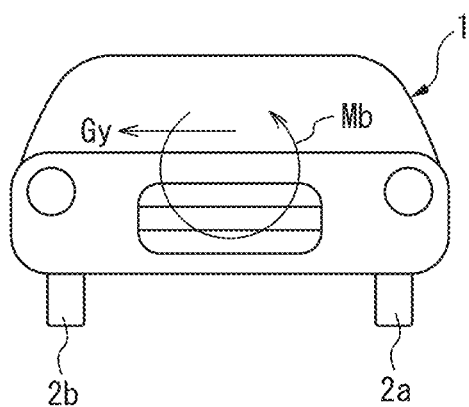

Next, this will be explained while referring to FIG. 6A to FIG. 8B. Note that, FIG. 6A is a figure when viewing the vehicle 1 from the lateral direction, FIG. 6B is figure when viewing the vehicle 1 from the front, and FIG. 7A to FIG. 8B are figures when viewing the vehicle 1 from above. Further, in FIG. 6A and FIG. 6B, Gx shows the acceleration applied in the longitudinal direction of the vehicle at the time of driving while accelerating (below, referred to as the "longitudinal acceleration Gx"), while Gy shows the acceleration applied in the lateral direction of the vehicle 1 at the time of turning of the vehicle (below, referred to as the "lateral acceleration Gy"). First, referring to FIG. 7A, in this FIG. 7A, the friction circles for the front wheels 2a and 2b and the rear wheels 3a and 3b when the vehicle 1 is being driven to advance at a constant speed are shown. Note that, as will be understood from FIG. 7A, FIG. 7A to FIG. 8B show the case where the ground loads of the front wheels 2a and 2b and rear wheels 3a and 3b at the time when the vehicle is stationary are substantially equal.

Figure 7A:
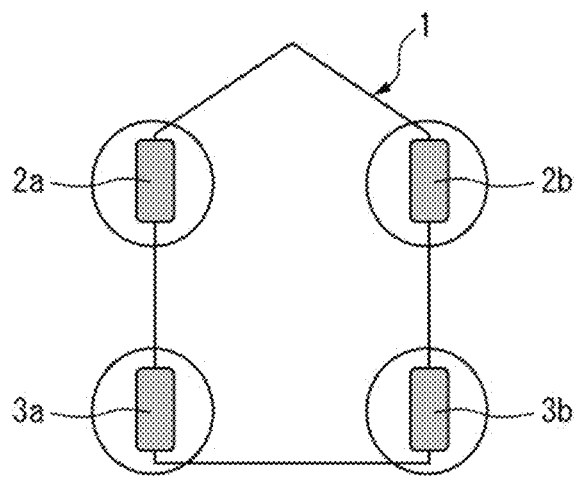
FIG. 7A and FIG. 7B are views showing sizes of friction circles of wheels.
Figure 7B:
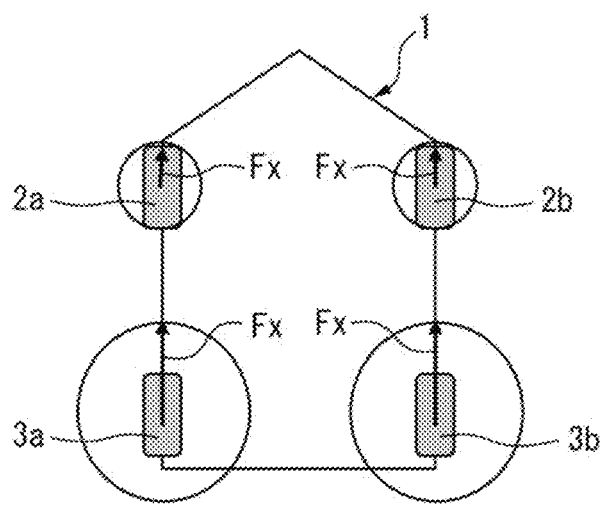

On the other hand, if drive torques are given to the front wheels 2a and 2b and rear wheels 3a and 3b and the vehicle 1 is accelerated, a moment Ma such as shown in FIG. 6A is generated at the vehicle 1 and as a result the ground loads of the front wheels 2a and 2b become smaller than the ground loads of the rear wheels 3a and 3b. Therefore, at this time, as shown in FIG. 7B, the diameters of the friction circles for the front wheels 2a and 2b become smaller than the diameters of the friction circles for the rear wheels 3a and 3b. At this time, as shown in FIG. 7B, if the drive torques applied to the front wheels 2a and 2b and rear wheels 3a and 3b are adjusted so that the longitudinal forces Fx generated at the ground contact surfaces of the front wheels 2a and 2b and rear wheels 3a and 3b become the limits, the best accelerating performance can be secured.

Figure 8A:
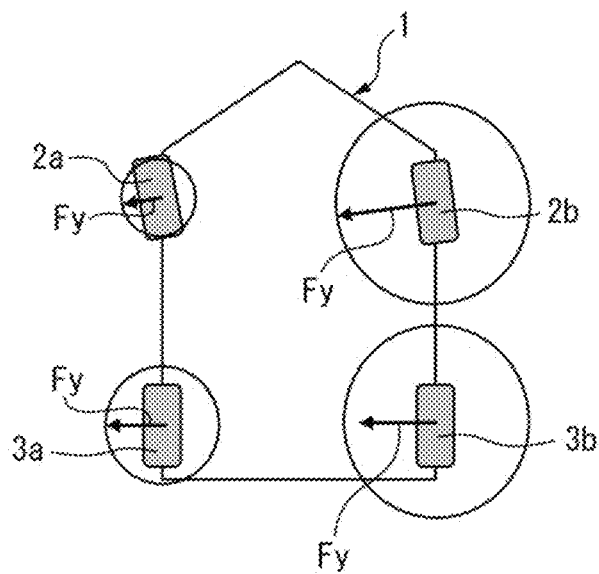
FIG. 8A and FIG. 8B are views showing sizes of friction circles of wheels.

On the other hand, FIG. 8A shows the case where the vehicle 1 is made to turn to the left in a state driven at a constant speed. Note that, at this time, the front wheel 2a and rear wheel 3a positioned at the inside with respect to the center of turn will hereinafter be referred to as the "front inside wheel 2a" and the "rear inside wheel 3a" while the front wheel 2b and rear wheel 3b positioned at the outside with respect to the center of turn will hereinafter be referred to as the "front outside wheel 2b" and the "rear outside wheel 3b". If the vehicle 1 is made to turn to the left, lateral acceleration Gy is applied to the vehicle 1 and a moment Mb such as shown in FIG. 6B is generated at the vehicle 1. As a result, the ground loads of the front inside wheel 2a and the rear inside wheel 3a become smaller than the ground loads of the front outside wheel 2b and the rear outside wheel 3b. Therefore, at this time, as shown in FIG. 8A, the diameters of the friction circles for the front inside wheel 2a and the rear inside wheel 3a become smaller than the diameters of the friction circles for the front outside wheel 2b and the rear outside wheel 3b. Note that, as explained above, at the ground contact surfaces of each tire, lateral forces Fy substantially proportional to the ground loads of the tires are generated. Therefore, at this time, as shown in FIG. 8A, lateral forces Fy substantially proportional to the diameters of the respectively corresponding friction circles are generated at the ground contact surfaces of the front inside wheel 2a, the front outside wheel 2b, the rear inside wheel 3a, and the rear outside wheel 3b.

In this regard, as explained above, in the embodiment according to the present invention, the vehicle 1 is designed so that when a large lateral acceleration Gy is generated at the vehicle 1, first understeer (or ploughing) occurs. On the other hand, when the vehicle 1 is for example made to turn to the left, as shown in FIG. 8A, the lateral forces Fy generated at the ground contact surfaces of the front outside wheel 2b and the rear outside wheel 3b become considerably larger than the lateral forces Fy generated at the ground contact surfaces of the front inside wheel 2a and the rear inside wheel 3a. Therefore, in the embodiment according to the present invention, the vehicle 1 is designed so that when the vehicle 1 is for example made to turn to the left, as shown in FIG. 8A, the lateral force Fy generated at the ground contact surface of the front outside wheel 2b becomes larger than the lateral force Fy generated at the ground contact surface of the rear outside wheel 3b, and thus first understeer occurs.

Figure 8B:
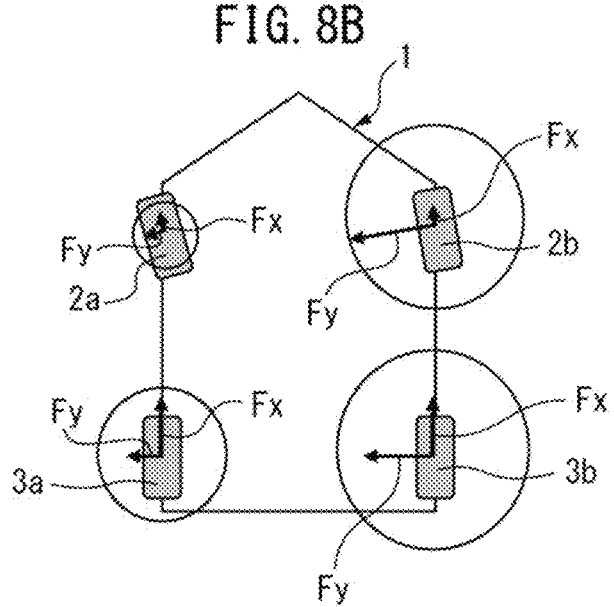

On the other hand, FIG. 8B shows the case where the vehicle 1 is made to turn to the left in the state driven while accelerating. At this time, the moment Ma such as shown in FIG. 6A and the moment Mb such as shown in FIG. 6B simultaneously occur at the vehicle 1. As a result, the ground load of the front inside wheel 2a becomes the smallest and the ground load of the rear inside wheel 3a becomes next smallest. In this case as well, in the same way as the case shown in FIG. 8A, the lateral forces Fy generated at the ground contact surfaces of the front inside wheel 2a and the rear inside wheel 3a become smaller. Therefore, at this time, if imparting drive torque proportional to the ground load of the front inside wheel 2a and drive torque proportional to the ground load of the rear inside wheel 3a to the front inside wheel 2a and the rear inside wheel 3a respectively, it becomes possible to raise the longitudinal forces Fx generated at the ground contact surfaces of the front inside wheel 2a and the rear inside wheel 3a close to the limits in the range of the composite forces Fxy of the longitudinal forces Fx and lateral forces Fy not exceeding the friction circles. If in this way, it becomes possible to raise the longitudinal forces Fx generated at the ground contact surfaces of the front inside wheel 2a and the rear inside wheel 3a close to the limit, the accelerating performance can be greatly improved.

In this regard, in the case where the vehicle 1 is for example made to turn to the left in the state driven while accelerating, if imparting drive torque proportional to the ground load of the front inside wheel 2a and drive torque proportional to the ground load of the rear inside wheel 3a respectively to the front inside wheel 2a and the rear inside wheel 3a, the drive torque applied to the front inside wheel 2a is made smaller than the drive torque applied to the rear inside wheel 3a. In this case, the drive torque applied to the front outside wheel 2b is made smaller in the same way as the drive torque applied to the front inside wheel 2a and the drive torque applied to the rear outside wheel 3b is made larger in the same way as the drive torque applied to the rear inside wheel 3a. If in this way the drive torque applied to the front outside wheel 2b is made smaller, the composite force Fxy of the longitudinal force Fx and the lateral force Fy at the front outside wheel 2b will not exceed the friction circle. Further, there is leeway before the limit of composite force Fxy of the longitudinal force Fx and the lateral force Fy at the rear outside wheel 3b, and thus the drive torque applied to the rear outside wheel 3b can be made larger. Therefore, when focusing on the ground load of the front inside wheel 2a and the ground load of the rear inside wheel 3a at the time of vehicle turning, by making the distribution of drive torque, that is, the distribution of drive force, to the front inside wheel 2a larger than the distribution of drive torque, that is, the distribution of drive force, to the rear inside wheel 3a when the ground load of the front inside wheel 2a is larger than the ground load of the rear inside wheel 3a and making the distribution of drive torque, that is, the distribution of drive force, to the front inside wheel 2a smaller than the distribution of drive torque, that is, the distribution of drive force, to the rear inside wheel 3a when the ground load of the front inside wheel 2a is smaller than the ground load of the rear inside wheel 3a, it becomes possible to secure excellent accelerating performance.

Therefore, in the present invention, in a four-wheel drive force distribution apparatus distributing drive force to the wheels of a four-wheel drive vehicle, the distribution of drive force to the front inside wheel 2a and the distribution of drive force to the rear inside wheel 3a are adjusted based on the ground load of the front inside wheel 2a and ground load of the rear inside wheel 3a at the time of turning of the vehicle 1 and the distribution of drive force to the front inside wheel 2a is made to become smaller than the distribution of drive force to the rear inside wheel 3a the smaller the ratio of the ground load of the front inside wheel 2a to the ground load of the rear inside wheel 3a during turning.

In this case, in one embodiment according to the present invention, the same drive torques, that is, drive forces, are distributed to the front inside wheel 2a and the front outside wheel 2b and the same drive torques, that is, drive forces, are distributed to the rear inside wheel 3a and the rear outside wheel 3b. That is, the smaller the ratio of the ground load of the front inside wheel 2a to the ground load of the rear inside wheel 3a during turning, the smaller the distribution of drive forces to the pair of front wheels 2a and 2b is made compared with the distribution of drive forces to the pair of rear wheels 3a and 3b.

Further, in a preferred embodiment according to the present invention, the ratio of the ground load of the front inside wheel 2a and the ground load of the rear inside wheel 3a at the time of vehicle turning is calculated and drive forces are distributed to the front inside wheel 2a and the rear inside wheel 3a in accordance with this ratio during turning. Furthermore, in this case, in the preferred embodiment according to the present invention, drive forces are distributed to the pair of front wheels 2a and 2b and the pair of rear wheels 3a and 3b in accordance with this ratio during turning. Therefore, next, the method of calculating the ratio of the ground load of the front inside wheel 2a and the ground load of the rear inside wheel 3a during turning will be explained with reference to FIG. 9A, FIG. 9B, and FIG. 10.

Figure 9A:
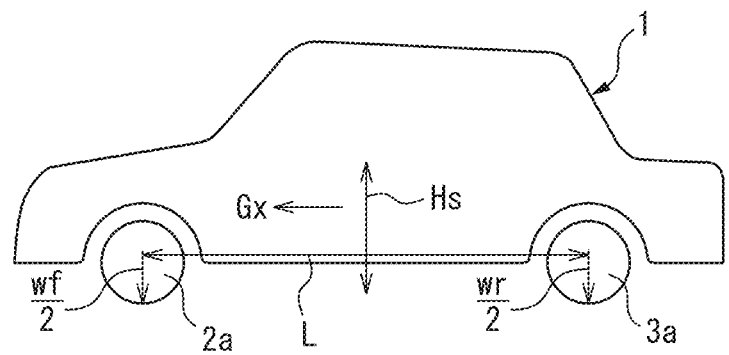
FIG. 9A and FIG. 9B are views for explaining amounts of change of ground loads of wheels.
Figure 9B:
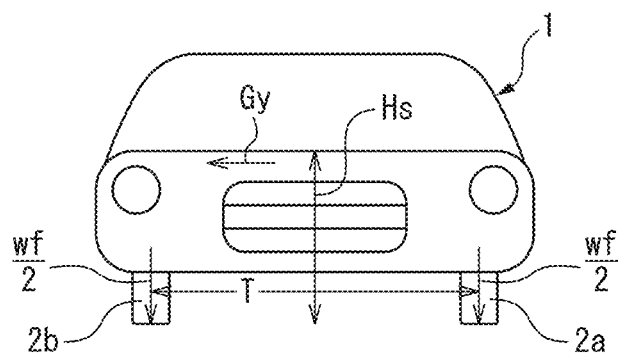

FIG. 9A is a figure similar to FIG. 6A when viewing a vehicle 1 from the lateral direction, while FIG. 9B is a figure similar to FIG. 6B when viewing a vehicle 1 from the front. Note that, in FIG. 9A and FIG. 9B, Hs indicates the height of the center of gravity, T indicates the vehicle tread, L indicates the wheelbase, wf indicates the vehicle load applied to the pair of front wheels 2a and 2b in the vehicle stationary state, wr indicates the vehicle load applied to the pair of rear wheels 3a and 3b in the vehicle stationary state, Gx indicates the longitudinal acceleration, and Gy indicates the lateral acceleration. Therefore, as shown in FIG. 9A and FIG. 9B, the ground loads of the front wheels 2a and 2b in the vehicle stationary state become wf/2 while the ground loads of the rear wheels 3a and 3b in the vehicle stationary state become wr/2.

Now then, if designating the weight of the vehicle 1 as "m" and amounts of change of the loads respectively acting on the front wheel 2a and front wheel 2b and amounts of change of the loads respectively acting on the rear wheel 3a and rear wheel 3b when longitudinal acceleration Gx is applied to the vehicle 1 as Δwx, in FIG. 9A, when longitudinal acceleration Gx is generated in the vehicle 1, the moment Ma (=m·Gx·Hs) such as shown in FIG. 6A acts on the vehicle 1. ½ of this moment Ma gives rise to a moment (Δwx·L) causing a change of the loads respectively applied to the front wheel 2a and rear wheel 2b, while the remaining ½ of this moment Ma gives rise to a moment (Δwx·L) causing a change in the loads respectively applied to the front wheel 2b and rear wheel 3b, so the amount of change of the ground load Δwx of the front wheels 2a and 2b and rear wheels 3a and 3b becomes Δwx=½m·Gx·Hs/L as shown in FIG. 9A.

On the other hand, when lateral acceleration Gy is generated at the vehicle 1, a moment Mb (=m·Gy·Hs) such as shown in FIG. 6B acts on the vehicle 1. However, in this case, the ratio of distribution of the moment Mb differs somewhat from when the longitudinal acceleration Gx is generated at the vehicle 1. That is, in the vehicle, usually the spring force of the suspension system on the front wheels is made stronger than the spring force of the suspension system on the rear wheels. In the embodiment according to the present invention as well, the spring force of the suspension system on the front wheels 2a and 2b is made stronger than the spring force of the suspension system on the rear wheels 3a and 3b. Therefore, as shown in FIG. 9B, when the lateral acceleration Gy is applied to the vehicle 1, the moment causing change of the loads applied to the front inside wheel 2a and the front outside wheel 2b becomes larger than the moment causing change of the loads applied to the rear inside wheel 3a and the rear outside wheel 3b.

In this case, if making Dwf the ratio of distribution of the moment Mb, making the ratio of distribution of the moment Mb to the moments causing change of the loads applied to the front inside wheel 2a and the front outside wheel 2b the value Dwf, making the ratio of distribution of the moment Mb to the moments causing change of the loads applied to the rear inside wheel 3a and the rear outside wheel 3b the value (1−Dwf), making the amount of change of the ground loads of the front inside wheel 2a and the front outside wheel 2b the value Δwy, and making the amount of change of the ground loads of the rear inside wheel 3a and the rear outside wheel 3b the value Δwz, when the lateral acceleration Gy is generated at the vehicle 1, the moment Mb·Dwf gives rise to a moment (Δwy·T) causing a change in the loads applied to the front inside wheel 2a and the front outside wheel 2b and the moment Mb·(1−Dwf) gives rise to a moment (Δwz·T) causing a change in the loads applied to the rear inside wheel 3a and the rear outside wheel 3b. Therefore, the amount of change of the ground load Δwy of the front inside wheel 2a and the front outside wheel 2b, as shown in FIG. 9B, becomes Δwy=(m·Gy·Hs/L)·Dwf and the amount of change of the ground load Δwz of the rear inside wheel 3a and the rear outside wheel 3b, as shown in FIG. 9B, becomes Δwz=(m·Gy·Hs/L)·(1−Dwf). Note that, the ratio of distribution Dwf of the moment Mb is for example made 0.6.

Figure 10:
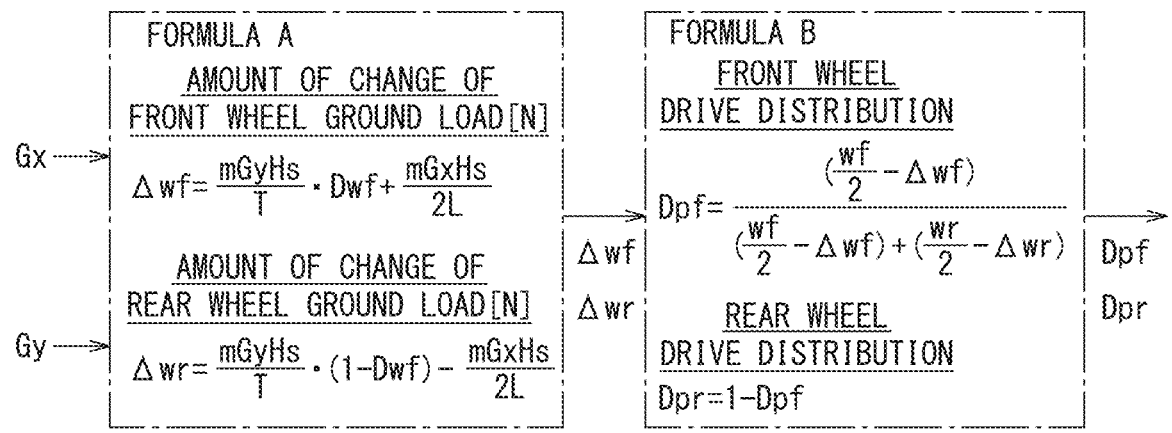
FIG. 10 is a view for explaining a method of calculation of a ratio of a ground load of the front inside wheel and a ground load of the rear inside wheel at the time of vehicle turning.

During turning of the vehicle 1, when the longitudinal acceleration Gx is generated at the vehicle 1, the ground load of the front inside wheel 2a decreases while when the lateral acceleration Gy is generated, the ground load of the front inside wheel 2a decreases as well, so the amount of change of the ground load Δwf of the front inside wheel 2a, as shown by the formula A in FIG. 10, becomes the sum of the amount of change of the ground load (amount of decrease) Δwy=(m·Gy·Hs/L)·Dwf of the front inside wheel 2a and the front outside wheel 2b when the lateral acceleration Gy is generated and the amount of change of the ground load Δwx=½·m·Gx·Hs/L of the front wheels 2a and 2b and rear wheels 3a and 3b when the longitudinal acceleration Gx is generated at the vehicle 1. As opposed to this, during turning of the vehicle 1, when the longitudinal acceleration Gx is generated at the vehicle 1, the ground load of the rear inside wheel 3a increases while when the lateral acceleration Gy is generated, the ground load of the rear inside wheel 3a decreases, so the amount of change of the ground load Δwr (amount of decrease) of the rear inside wheel 3a, as shown by formula A in FIG. 10, becomes the value of the amount of change of the ground load Δwy=(m·Gy·Hs/L)·(1−Dwf) of the front inside wheel 2a and the front outside wheel 2b when the lateral acceleration Gy is generated minus the amount of change of the ground load Δwx=½·m·Gx·Hs/L of the front wheels 2a and 2b and the rear wheels 3a and 3b when the longitudinal acceleration Gx is generated at the vehicle 1.

Now then, as explained above, the ground load of the front wheel 2a in the vehicle stationary state is wf/2. Therefore, during turning of the vehicle 1, the ground load of the front inside wheel 2a when the longitudinal acceleration Gx and lateral acceleration Gy are generated becomes the value of wf/2 minus the amount of change Δwf of the ground load of the front inside wheel 2a (wf/2−Δwf). On the other hand, the ground load of the rear wheel 3a in the vehicle stationary state is wr/2. Therefore, during turning of the vehicle 1, the ground load of the rear inside wheel 3a when the longitudinal acceleration Gx and lateral acceleration Gy are generated becomes the value of wr/2 minus the amount of change of the ground load Δwr of the rear inside wheel 3a (wr/2−Δwr). In this way, in the first embodiment according to the present invention, the longitudinal acceleration sensor 50 detecting acceleration in the vehicle longitudinal direction and the lateral acceleration sensor 51 detecting acceleration in the vehicle lateral direction are provided, and the ratio of the ground load of the front inside wheel 2a (wf/2−Δwf) and the ground load of the rear inside wheel 3a (wr/2−Δwr) is calculated from the longitudinal acceleration Gx detected by the longitudinal acceleration sensor 50 and the lateral acceleration Gy detected by the lateral acceleration sensor 51. The drive torque, that is, the drive force, is distributed to the front inside wheel 2a and the rear inside wheel 3a proportional to these ground load of the front inside wheel 2a (wf/2−Δwf) and ground load of the rear inside wheel 3a (wr/2−Δwr).

Note that, in the embodiment according to the present invention, as shown in formula B of FIG. 10, these ground load of the front inside wheel 2a (wf/2−Δwf) and ground load of the rear inside wheel 3a (wr/2−Δwr) are used to calculate the drive torque to the front inside wheel 2a at the time of vehicle turning, that is, the distribution Dpf of the drive force, and the drive torque to the rear inside wheel 3a, that is, the distribution Dpr (=1−Dpf) of the drive force. During turning, drive forces are distributed to the front inside wheel 2a and the rear inside wheel 3a in accordance with these distributions Dpf and Dpr. Note that, in this first embodiment, drive forces are distributed to the pair of front wheels 2a and 2b and the pair of rear wheels 3a and 3b in accordance with these distributions Dpf and Dpr during turning.

Figure 11:
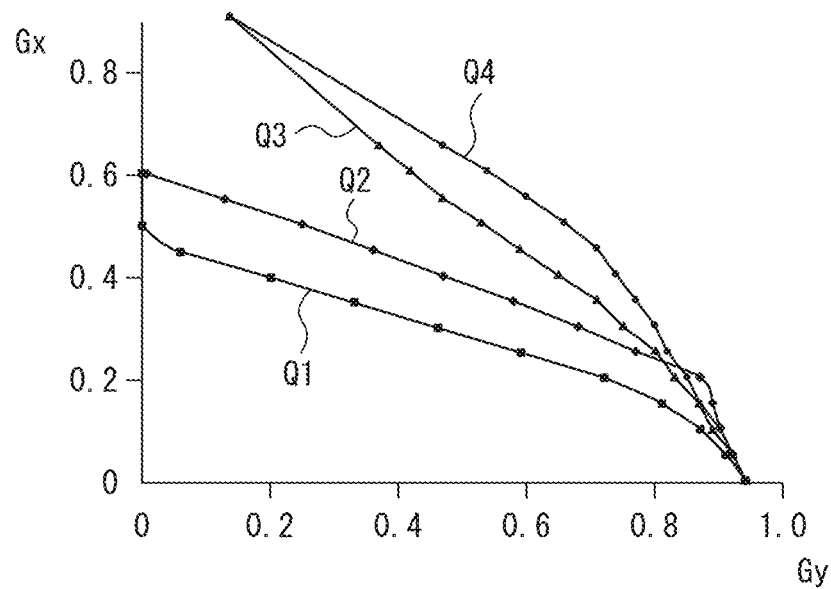
FIG. 11 is a graph showing a relationship of a longitudinal acceleration Gx and a lateral acceleration Gy.

FIG. 11 shows the results of calculation showing the relationship between the longitudinal acceleration Gx and lateral acceleration Gy generated at the vehicle 1 when the composite forces Fxy of the longitudinal forces Fx and the lateral forces Fy of the tires are at the limits. Note that, in FIG. 11, Q1 shows the case of driving the front wheels, Q2 shows the case of driving the rear wheels, Q3 shows the case of distributing drive forces to the front inside wheel 2a and front outside wheel 2b and the rear inside wheel 3a and rear outside wheel 3b in accordance with the ratio of the average value of the ground loads of the front inside wheel 2a and front outside wheel 2b and the average value of the ground loads of the rear inside wheel 3a and rear outside wheel 3b, and Q4 shows the case of distributing drive forces to the front inside wheel 2a and front outside wheel 2b and the rear inside wheel 3a and rear outside wheel 3b in accordance with the ground load of the front inside wheel 2a and the ground load of the rear inside wheel 3a. The relationship shown in this FIG. 11 shows well the relationship of the actual longitudinal acceleration Gx and lateral acceleration Gy. From FIG. 11, it is understood that in the case of distributing drive forces to the front inside wheel 2a and front outside wheel 2b and the rear inside wheel 3a and rear outside wheel 3b in accordance with the ground load of the front inside wheel 2a and the ground load of the rear inside wheel 3a as shown in Q4, it is possible to make the longitudinal acceleration Gx and lateral acceleration Gy generated at the vehicle 1 when the composite forces Fxy of the longitudinal forces Fx and the lateral forces Fy of the tires are at the limits the maximum, that is, make the accelerating performance and the turning performance maximum.

Figure 12:
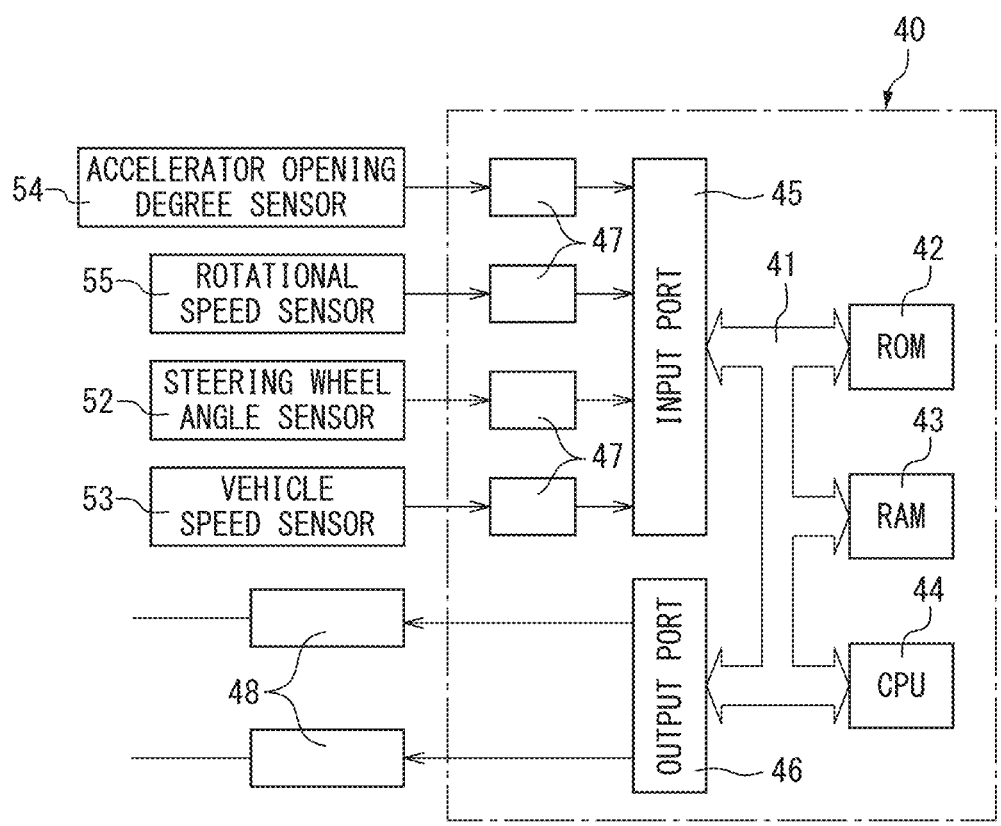
FIG. 12 is a view showing an electronic control unit etc. used in a second embodiment.
Figures 13A, 13B:
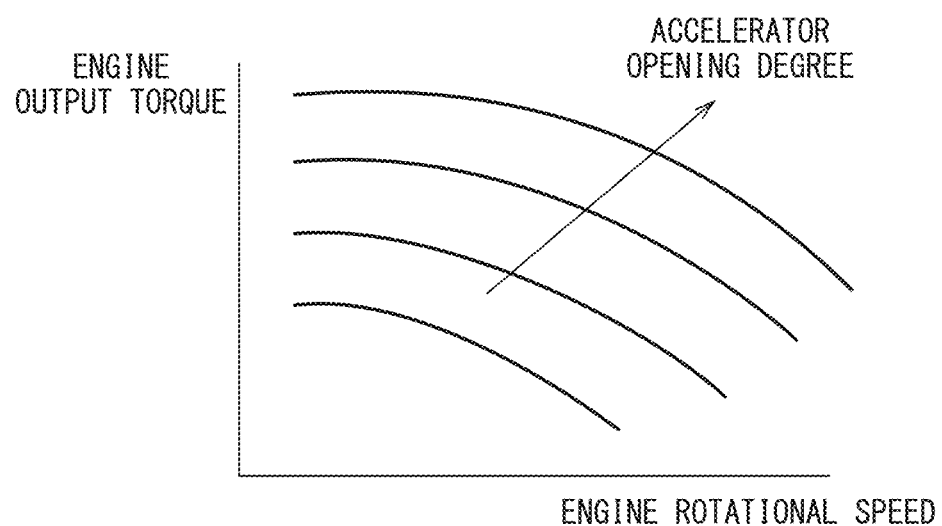
FIG. 13A and FIG. 13B are respectively a view showing a relationship of an rotational speed, accelerator opening degree, and engine output torque and a view for explaining a method of calculation of the lateral acceleration Gy.

Next, referring to FIG. 12 to FIG. 13B, a second embodiment according to the present invention will be explained. In this second embodiment, when using the formula A and formula B of FIG. 10 to calculate the distribution Dpf of drive torques to the pair of front wheels 2a and 2b and the distribution Dpr of drive torques to the pair of rear wheels 3a and 3b, the estimated values of the longitudinal acceleration Gx and lateral acceleration Gy are used. FIG. 12 shows the electronic control unit 40 etc. used in this second embodiment. As will be understood from FIG. 12, in this second embodiment, instead of the longitudinal G sensor 50 and lateral G sensor 51 shown in FIG. 1 and FIG. 3, outputs of an accelerator opening degree sensor 54 detecting the accelerator opening degree and a rotational speed sensor 55 detecting the engine rotational speed are input through the AD converters 47 to the input port 45. In this second embodiment, the longitudinal acceleration Gx and lateral acceleration Gy are estimated based on the accelerator opening degree detected by the accelerator opening degree sensor 54, the engine rotational speed detected by the rotational speed sensor 55, the steering wheel angle detected by the steering wheel angle sensor 52, and the vehicle speed detected by the vehicle speed sensor 53.

First, explaining the method of calculating the longitudinal acceleration Gx, if multiplying the speed reduction gear ratio at the drive torque distributor 5 and differential gears 8 and 10 with the output torque of the engine, the result becomes the drive torques of the tires. If dividing the drive torques of the tires by the radii of the tires, the result becomes the longitudinal forces Fx generated at the ground contact surfaces of the tires. The longitudinal forces Fx are expressed by the product of the vehicle weight and the longitudinal acceleration Gx. The radii of the tires and the vehicle weight are constant, so in the end, the longitudinal acceleration Gx becomes determined from the output torque of the engine and the speed reduction gear ratio. On the other hand, the output torque of the engine, as shown in FIG. 13A, is a function of the accelerator opening degree and the engine rotational speed. Therefore, the output torque of the engine is found from the accelerator opening degree and the engine rotational speed. Therefore, in this second embodiment, the longitudinal acceleration Gx is calculated from the accelerator opening degree, the engine rotational speed, and the speed reduction gear ratio. The calculated value of this longitudinal acceleration Gx is made the estimated value of the longitudinal acceleration Gx.

On the other hand, the lateral acceleration Gy becomes larger the larger the steering wheel angle when a turning action is performed and becomes larger the larger the vehicle speed when a turning action is performed. That is, the lateral acceleration Gy is a function of the steering wheel angle and the vehicle speed. In this second embodiment, the lateral acceleration Gy is calculated from the formula shown in FIG. 13B. Note that, in the formula shown in FIG. 13B, St shows the steering wheel angle, V shows the vehicle speed, L shows the wheelbase, "n" shows the steering gear ratio (gear ratio of steering wheel angle and each tire), and K shows the stability factor (constant determined in accordance with the vehicle). In this second embodiment, the lateral acceleration Gy is calculated from the steering wheel angle and the vehicle speed using the formula shown in FIG. 13B. The calculated value of this longitudinal acceleration Gx is made the estimated value of the longitudinal acceleration Gx.

In this second embodiment, the estimated value of the longitudinal acceleration Gx and the estimated value of the lateral acceleration Gy are used to calculate the distribution Dpf of the drive torque to the front inside wheel 2a and the distribution Dpr of the drive torque to the rear inside wheel 3a shown in FIG. 10. That is, in this second embodiment, the longitudinal acceleration Gx is estimated from the engine output torque and the gear ratio between the engine and drive wheels, the lateral acceleration Gy is estimated from the steering wheel angle and vehicle speed, and the ratio of the ground load of the front inside wheel 2a and the ground load of the rear inside wheel 3a is calculated from the estimated longitudinal acceleration Gx and the estimated lateral acceleration Gy.

Figure 14:
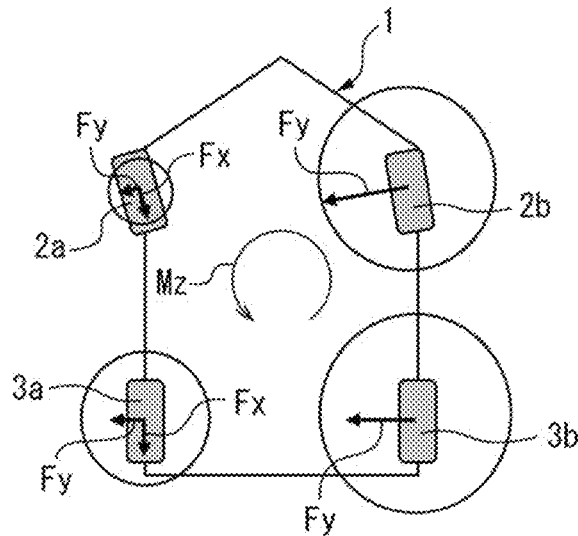
FIG. 14 is a view showing sizes of friction circles of the wheels.
Figure 15:
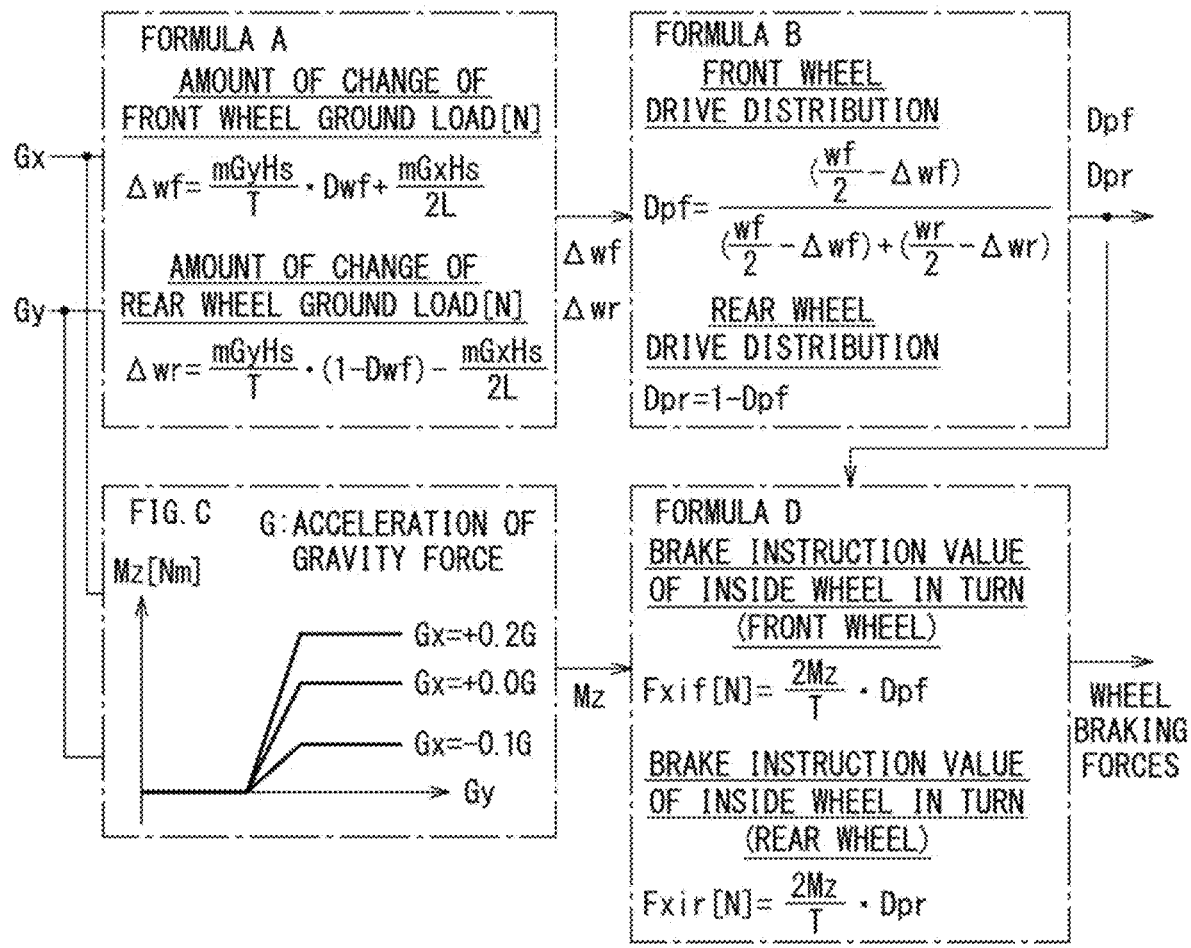
FIG. 15 is a view for explaining a method of calculation of a ratio of a ground load of the front inside wheel and a ground load of the rear inside wheel at the time of vehicle turning etc.
Figure 16:
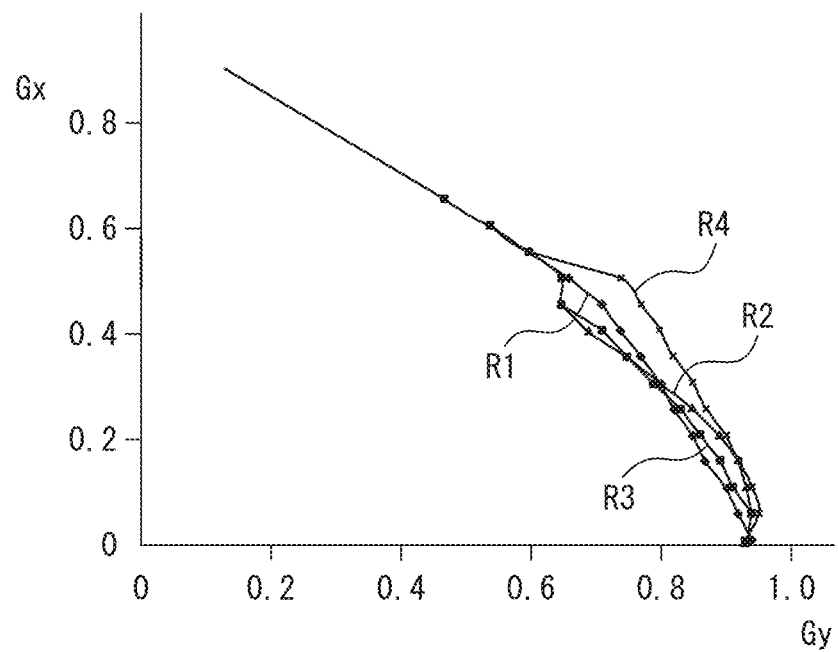
FIG. 16 is a graph showing a relationship of a longitudinal acceleration Gx and a lateral acceleration Gy.

FIG. 14 to FIG. 16 show embodiments additionally performed with respect to the first embodiment and the second embodiment. First, referring to FIG. 14 showing a state similar to FIG. 8B, in this embodiment, when the vehicle 1 is made to turn, the yaw moment Mz required for raising the turning performance to the maximum extent is found. To enable this yaw moment Mz to be generated, braking forces are imparted to only the front inside wheel 2a and the rear inside wheel 3a by the brake control device 32 shown in FIG. 1 or FIG. 3. The braking forces generated at the ground contact surfaces of the tires at this time are shown as the longitudinal forces Fx in FIG. 14. In this case as well, braking forces are imparted to the front inside wheel 2a and the rear inside wheel 3a proportional to the ground load of the front inside wheel 2a and the ground load of the rear inside wheel 3a so that the braking forces do not exceed the limits of the grip strengths. That is, in this embodiment, during turning of the vehicle, braking forces are imparted to the front inside wheel 2a and the rear inside wheel 3a in accordance with the ground load of the front inside wheel 2a and the ground load of the rear inside wheel 3a.

Next, referring to FIG. 15, the method of distribution of the braking forces will be explained. In FIG. 15, formula A and formula B are the same as formula A and formula B in FIG. 10. Therefore, the distribution Dpf of the drive torque to the front inside wheel 2a and the distribution Dpr (=1−Dpf) of the drive torque to the rear inside wheel 3a at the time of vehicle turning are calculated by formula A and formula B. In this embodiment, these distribution Dpf and distribution Dpr are used to distribute the braking forces. Now, in FIG. 15, FIG. C shows the yaw moment Mz required for raising the turning performance to the maximum extent. As shown in FIG. C, this yaw moment Mz is a function of the longitudinal acceleration Gx and the lateral acceleration Gy. Note that, these longitudinal acceleration Gx and lateral acceleration Gy are the same as the longitudinal acceleration Gx and the lateral acceleration Gy used in formula A. As shown in FIG. C, the yaw moment Mz is increased if the lateral acceleration Gy becomes greater by a certain extent or more while the amount of increase at this time is made larger the larger the longitudinal acceleration Gx.

Now then, if the vehicle tread is T and the braking forces generated at the ground contact surfaces of the inside wheels is Fxi, when the braking force Fxi is generated at the ground contact surfaces of the inside wheel, a yaw moment of Fxi·T/2 of the vehicle is generated. Therefore, to generate the yaw moment Mz, it is sufficient to make Fxi·T/2=Mz, that is, to make the braking forces Fxi the value 2Mz/T. In this case, in this embodiment, as shown by formula D of FIG. 15, the brake instruction value Fxif for the front inside wheel 2a and the brake instruction value Fxir for the rear inside wheel 3a are respectively distributed in accordance with the distribution Dpf and the distribution Dpr. That is, the brake instruction value Fxif for the front inside wheel 2a is made (2Mz/T)·Dpf, while the brake instruction value Fxir for the rear inside wheel 3a is made (2Mz/T)·Dpr. Based on these brake instruction value Fxif and brake instruction value Fxir, the brake oil pressure to the front inside wheel 2a and the brake oil pressure to the rear inside wheel 3a are controlled by the brake control device 32 so that the braking force Fxif is generated at the front inside wheel 2a and the braking force Fxir is generated at the rear inside wheel 3a.

FIG. 16 shows the results of calculation of the relationship between the longitudinal acceleration Gx and lateral acceleration Gy occurring at the vehicle 1 when a turning action is performed. Note that, in FIG. 16, R1 shows the case where control causing generation of a yaw moment Mz at the time of vehicle turning is not performed, R2 shows the case where braking control for only the front inside wheel 2a is performed so that a yaw moment Mz is generated at the time of vehicle turning, R3 shows the case where braking control for only the rear inside wheel 3a is performed so that a yaw moment Mz is generated at the time of vehicle turning, and R4 shows the case of distributing braking forces to the front inside wheel 2a and the rear inside wheel 3a in accordance with the ratio of the ground load of the front inside wheel 2a and the ground load of the rear inside wheel 3a so that a yaw moment Mz is generated at the time of vehicle turning. The relationship shown in this FIG. 16 shows well the relationship between the actual longitudinal acceleration Gx and lateral acceleration Gy. Therefore, from FIG. 16, it will be understood that in the case of distributing braking forces to the front inside wheel 2a and the rear inside wheel 3a in accordance with the ratio of the ground load of the front inside wheel 2a and the ground load of the rear inside wheel 3a so that a yaw moment Mz is generated at the time of vehicle turning as shown in R4, it is possible to increase the longitudinal acceleration Gx and lateral acceleration Gy generated at the vehicle 1, that is, the improve the accelerating performance and the turning performance.

Next, referring to FIG. 17, one example of operational control will be explained. FIG. 17 shows a routine for performing this operational control. This routine is for example performed by interruption every certain crank angle.

Referring to FIG. 17, first, at step 70, longitudinal acceleration Gx and lateral acceleration Gy are acquired. In this case, in the first embodiment, the longitudinal acceleration Gx is detected by the longitudinal G sensor 50 and the lateral acceleration Gy is detected by the lateral G sensor 51. On the other hand, in the second embodiment, the longitudinal acceleration Gx is estimated from the accelerator opening degree and engine rotational speed and speed reduction gear ratio while the lateral acceleration Gy is estimated from the steering wheel angle and the vehicle speed. Next, at step 71, formula A in FIG. 10 or FIG. 15 is used to calculate the amount of change of the ground load Δwf of the front inside wheel 2a and the amount of change of the ground load Δwr of the rear inside wheel 3a. Next, at step 72, the distribution Dpf of the drive torque to the front inside wheel 2a and the distribution Dpr of the drive torque to the rear inside wheel 3a are calculated. Next, at step 73, the yaw moment Mz is calculated from FIG. 15C.

Next, at step 74, formula D in FIG. 15 is used to calculate the brake instruction value Fxif for the front inside wheel 2a and the brake instruction value Fxir for the rear inside wheel 3a. Next, at step 75, the front wheels 2a and 2b and rear wheels 3a and 3b are driven based on the distribution Dpf of the drive torque to the front inside wheel 2a and the distribution Dpr of the drive torque to the rear inside wheel 3a calculated at step 72. Next, at step 76, the braking action of the front inside wheel 2a and the braking action of the rear inside wheel 3a are performed based on the brake instruction value Fxif for the front inside wheel 2a and the brake instruction value Fxir for the rear inside wheel 3a calculated at step 74. Note that, in the first embodiment and second embodiment, steps 73, 74, and 76 are omitted.

The invention claimed is:

1. A four-wheel drive force distribution apparatus for distributing drive forces to wheels of a four-wheel drive vehicle, wherein said apparatus is configured to
    adjust a distribution of drive force to a front inside wheel and a distribution of drive force to a rear inside wheel based on a ground load of the front inside wheel and a ground load of the rear inside wheel when the vehicle is turning and
    reduce the distribution of drive force to the front inside wheel compared with the distribution of drive force to the rear inside wheel the smaller a ratio of the ground load of the front inside wheel to the ground load of the rear inside wheel during turning.

2. The four-wheel drive force distribution apparatus according to claim 1, wherein said apparatus is configured to reduce the distribution of drive forces to the pair of front wheels compared with the distribution of drive forces to the pair of rear wheels the smaller the ratio of the ground load of the front inside wheel to the ground load of the rear inside wheel during turning.

3. The four-wheel drive force distribution apparatus according to claim 1, wherein said apparatus is configured to calculate the ratio of the ground load of the front inside wheel and the ground load of the rear inside wheel at the time of vehicle turning and distribute drive forces to the front inside wheel and the rear inside wheel in accordance with the calculated ratio during turning.

4. The four-wheel drive force distribution apparatus according to claim 3, wherein said apparatus is configured to distribute drive forces to the pair of front wheels and the pair of rear wheels in accordance with the calculated ratio during turning.

5. The four-wheel drive force distribution apparatus according to claim 3, wherein said apparatus comprises a longitudinal acceleration sensor detecting acceleration in a vehicle longitudinal direction and a lateral acceleration sensor detecting acceleration in a vehicle lateral direction, and the ratio of the ground load of the front inside wheel and the ground load of the rear inside wheel is calculated from the longitudinal acceleration detected by the longitudinal acceleration sensor and the lateral acceleration detected by the lateral acceleration sensor.

6. The four-wheel drive force distribution apparatus according to claim 3, wherein a longitudinal acceleration is estimated from an engine output torque and a gear ratio between an engine and drive wheels, a lateral acceleration is estimated from a steering wheel angle and a vehicle speed, and the ratio of the ground load of the front inside wheel and the ground load of the rear inside wheel is calculated from the estimated longitudinal acceleration and the estimated lateral acceleration.

7. The four-wheel drive force distribution apparatus according to claim 3, wherein an amount of change of the ground load of the front inside wheel and an amount of change of the ground load of the rear inside wheel at the time of vehicle turning are calculated and the ratio of the ground load of the front inside wheel and the ground load of the rear inside wheel is calculated from the amount of the change of ground load of the front inside wheel and the amount of the change of ground load of the rear inside wheel.

8. The four-wheel drive force distribution apparatus according to claim 3, wherein said apparatus is configured to impart braking forces to the front inside wheel and the rear inside wheel at the time of vehicle turning.

9. The four-wheel drive force distribution apparatus according to claim 8, wherein said apparatus is configured to distribute the braking forces imparted to the front inside wheel and the rear inside wheel in accordance with said ratio at the time of vehicle turning.

* * * * *